United States Patent [19]

Heimann

[11] Patent Number: 4,534,239
[45] Date of Patent: Aug. 13, 1985

[54] BRAKE CABLE FITTING INCLUDING SCRAPER MEANS

[76] Inventor: Robert L. Heimann, Rte. 2, Huntsville, Mo. 65259

[21] Appl. No.: 619,709

[22] Filed: Jun. 14, 1984

Related U.S. Application Data

[63] Continuation of Ser. No. 243,463, Mar. 13, 1981, abandoned, which is a continuation-in-part of Ser. No. 73,076, Sep. 6, 1979, Pat. No. 4,304,149.

[51] Int. Cl.³ .................................................. F16C 1/10
[52] U.S. Cl. ..................................... 74/501 R; 277/24
[58] Field of Search ............... 74/501 R, 501 P, 502; 403/373, 374, 376; 277/24

[56] References Cited

U.S. PATENT DOCUMENTS

| | | |
|---|---|---|
| 1,483,218 | 2/1924 | Fahnestock . |
| 2,954,248 | 9/1960 | Brickman . |
| 3,101,205 | 8/1963 | Benham . |
| 3,182,120 | 5/1965 | Duhn . |
| 3,221,572 | 12/1965 | Swick . |
| 3,366,405 | 1/1968 | Sevrence . |
| 3,415,549 | 12/1968 | Chatham . |
| 3,542,980 | 11/1970 | Hamilton . |
| 3,654,382 | 4/1972 | Rubright . |
| 4,074,945 | 2/1978 | Kraus et al. . |
| 4,093,241 | 6/1978 | Muntjanoff et al. . |
| 4,131,379 | 12/1978 | Gordy et al. . |

FOREIGN PATENT DOCUMENTS 1224692  2/1960  France ........................... 74/501 P Primary Examiner—Kenneth J. Dorner
Attorney, Agent, or Firm—Laubscher, Philpitt & Laubscher

[57] ABSTRACT

A fitting is disclosed for brake cable assemblies including an inner cable member and an outer cable sheath, comprising a body member, and an annular seal member carried by the body member, characterized by the provision of an annular scraper device integral with one of the body and seal members. The inner cable member preferably includes a stranded metal core, and a synthetic plastic liner mounted concentrically about the core, the scraper device being operable to scrape impurities from the outer periphery of the inner cable member. In one embodiment, the body member is formed of a rigid synthetic plastic material, the scraper device being integral with one end of the body member. In one form, the seal is formed of a resilient material and is mounted within the body member; in another form, the seal and scraper are both integral with the body member. In another embodiment, the scraper device is carried by the resilient seal member which in turn is mounted within a rigid fitting body, such as a self-retaining snap-in assemblage, a metal turning, or a synthetic plastic body member.

3 Claims, 32 Drawing Figures

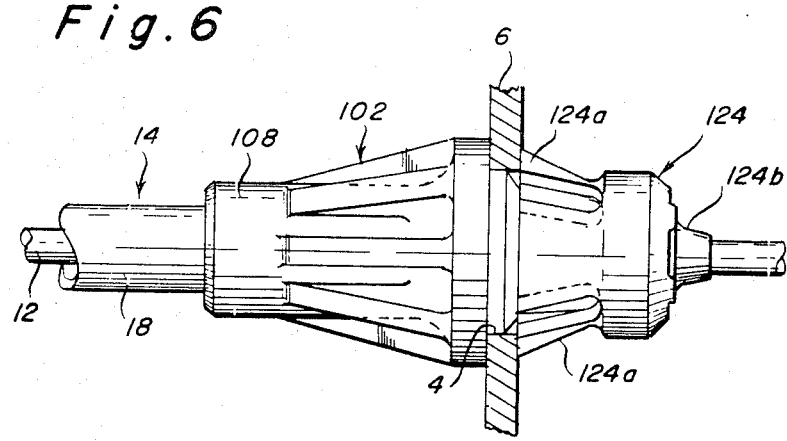
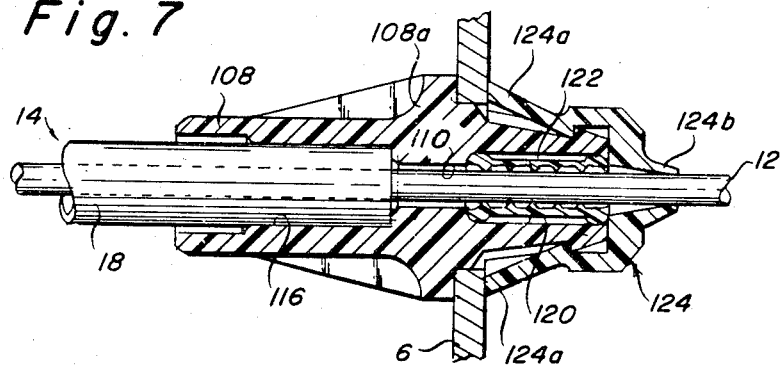
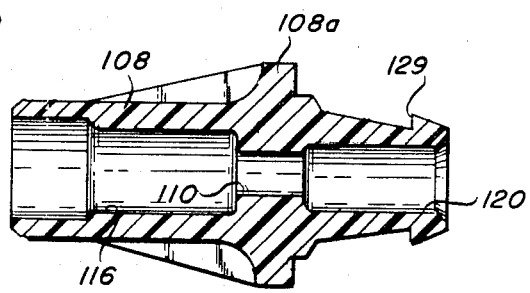
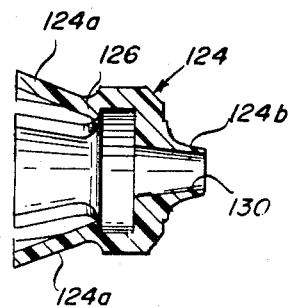

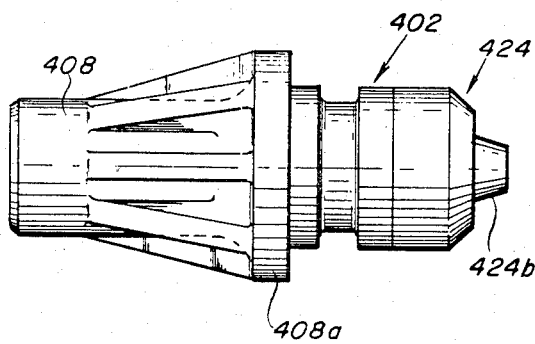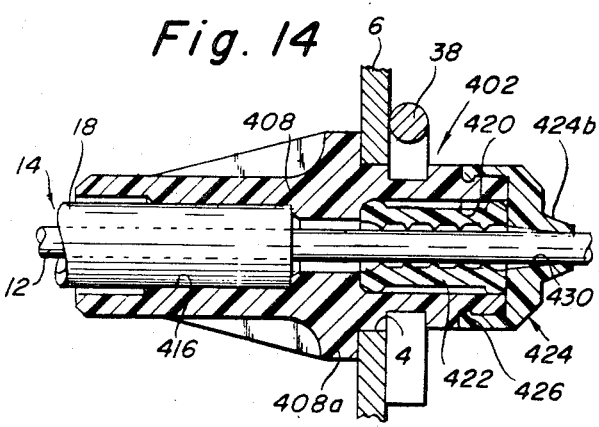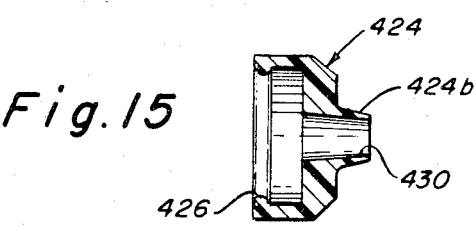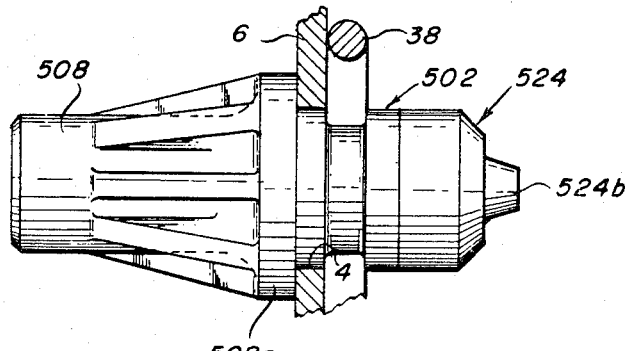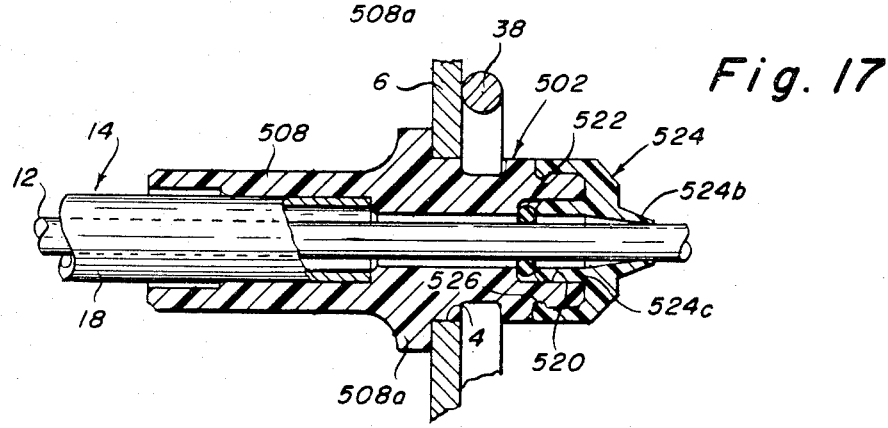

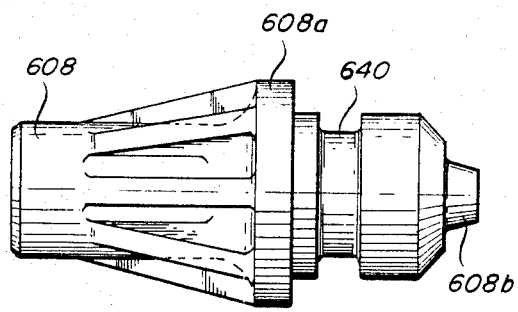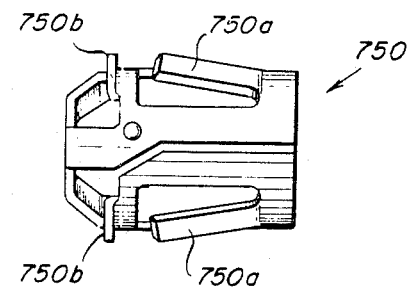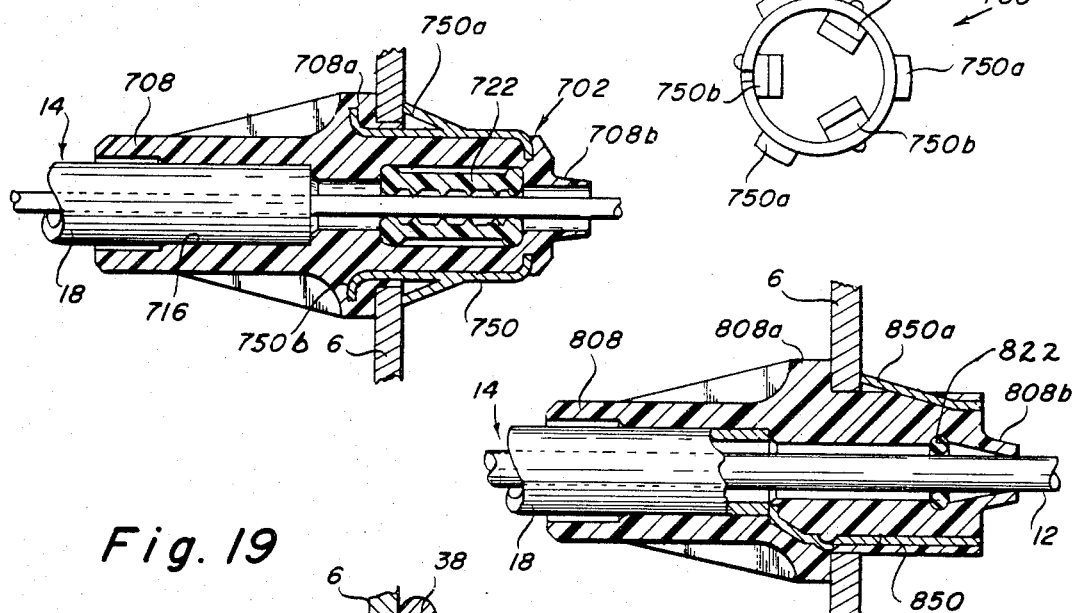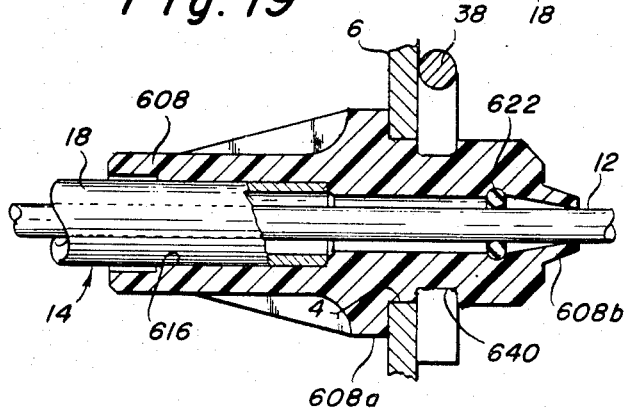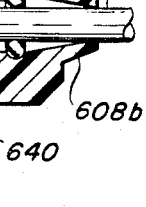

BRAKE CABLE FITTING INCLUDING SCRAPER MEANS

REFERENCE TO COMPANION APPLICATION

This application is a continuation of application Ser. No. 243,463 filed Mar. 13, 1981, now abandoned, which was a continuation-in-part application based on parent application Ser. No. 73,076 filed Sept. 6, 1979 in the name of Robert L. Heimann entitled "Synthetic Plastic End Fitting for Brake Assemblies" now U.S. Pat. No. 4,304,149.

BRIEF DESCRIPTION OF THE PRIOR ART

End fittings for mounting brake cable assemblies within an opening contained in a support are well known in the prior art, as evidenced by the prior patents to Brickman U.S. Pat. No. 2,954,248, Benham U.S. Pat. No. 3,101,205, Swick U.S. Pat. No. 3,221,572, Severnce U.S. Pat. No. 3,366,405, Chatham U.S. Pat. No. 3,415,549, Hamilton U.S. Pat. No. 3,542,980, Kraus U.S. Pat. No. 4,074,945 and Gordy et al U.S. Pat. No. 4,131,379 (the latter being assigned to the same assignee as the instant invention).

In the aforementioned Hamilton U.S. Pat. No. 3,542,980, the fitting includes a one-piece body member molded from a synthetic plastic material, and the use of resilient grommets or sleeves is taught by Swick and Chatham. The sleeve of Swick is provided with a flashing lip portion which retains grease on the cable for lubricated movement thereof relative to the concentrically arranged outer sleeve member. Furthermore, the use of annular seal means in combination with scraper for sealing the space between an inner rod member and a concentrically arranged outer sleeve member is broadly disclosed in the patent to Muntjanoff et al U.S. Pat. No. 4,093,241.

SUMMARY OF THE INVENTION

The present invention was developed to provide an improved economical brake cable end fitting that not only affords a greater sealing capacity of the annular space between the inner cable and concentrically arranged outer sleeve components of the brake cable assembly, but also is easily connected with, and more positively retained within, an opening contained in a fixed support.

Accordingly, a primary object of the present invention is to provide an improved end fitting that includes rigid body means containing a through bore that communicates at one end with an enlarged first cylindrical recess that receives one end of the outer sleeve member of the brake cable assembly when the protruding end of the inner cable member is inserted through the bore. Annular seal means are carried by the body means for concentric engagement with the periphery of the inner cable member, thereby to retain grease or other lubricant in the annular space or chamber between the cable assembly components, and to prevent particles of impurities from entering this space. In accordance with the present invention, scraper means are formed integrally with one of the body and annular seal means for scraping impurities from the peripheral surface of the inner cable member.

According to a more specific object of the invention, the body means comprises a body member formed of rigid synthetic plastic material, and both the seal means and the scraper means are formed integrally with the body member. According to a modification, only the scraper means are formed integrally with the body member, the seal means comprising an annular seal member formed of resilient synthetic plastic material mounted in an annular recess contained in the wall of the through bore formed in the body member.

According to another object of the invention, the seal means comprises a resilient synthetic plastic annular seal member, the scraper means being integral with one end of the seal member. The rigid body means which receives the seal member may be in the form of a self-retaining anchoring assemblage (of the type shown in the aforementioned Gordy et al U.S. Pat. No. 4,131,379), a tubular metal turning body, or a synthetic plastic body member. Preferably, the resilient seal member is provided at one end with an external annular flange portion that extends within the first cylindrical recess at one end of the body member for compression by the end of the outer cable sheath, thereby to afford sealing of the space between the inner and outer cable members. Further sealing is produced at the other end of the seal body by means of internal ribs that are in sealing engagement with the outer periphery of the inner cable member. Preferably these internal sealing ribs are formed on an axially projecting portion of the seal that carries the scraper means, which projecting portion extends through an opening contained in an end wall of the body member against which the sealing member abuts.

The inner member of the cable assembly includes a stranded metal core and an outer liner layer of synthetic plastic material, the scraper means comprising an annular convergent frustoconical scraper portion arranged concentrically about the inner cable member, which scraper portion has a minimum diameter that is generally equal to that of the inner cable member. The scraper portion may be formed either integrally with the tubular body member, or on the resilient seal that is mounted within the body member.

According to a further object of the invention, retaining means are provided for positively retaining the fitting in a support opening. To this end, the body member includes an outer circumferential flange for engaging one surface of the support, retaining fingers being provided at the other end of the body member for engaging the other support surface. The retaining fingers are formed from a tubular metal sleeve that is embedded in the synthetic plastic body member, or that comprises part of a self-retaining anchoring assemblage.

BRIEF DESCRIPTION OF THE DRAWING

Other objects and advantages of the invention will become apparent from a study of the following specification when viewed in the light of the accompanying drawing, in which:

FIGS. 6 and 7 are elevational and longitudinal sectional views, respectively, of a modification of the invention of FIGS. 1 and 2;

FIGS. 8 and 9 are longitudinal sectional views of the tubular body and cover members of FIG. 7;

FIGS. 13 and 14 are elevational and sectional views, respectively, of a modification of the end fitting of FIGS. 1 and 2, the cover member being provided with inner cable scraper means, and FIG. 15 is a sectional view of the cover member of FIG. 14;

FIGS. 16 and 17 are elevational and sectional views, respectively, of a modification of the end fitting of FIGS. 13 and 14;

FIGS. 18 and 19 are elevational and longitudinal sectional views, respectively, of an embodiment of the invention in which the scraper means are integral with the synthetic plastic fitting body;

FIG. 20 is a longitudinal sectional view of a further embodiment of the invention;

FIGS. 21 and 22 are elevational and right hand end views, respectively, of the retaining finger metal sleeve means of FIG. 20;

FIG. 23 is a longitudinal sectional view of a modification of the end fitting of FIG. 20;

DETAILED DESCRIPTION

Figure 1:
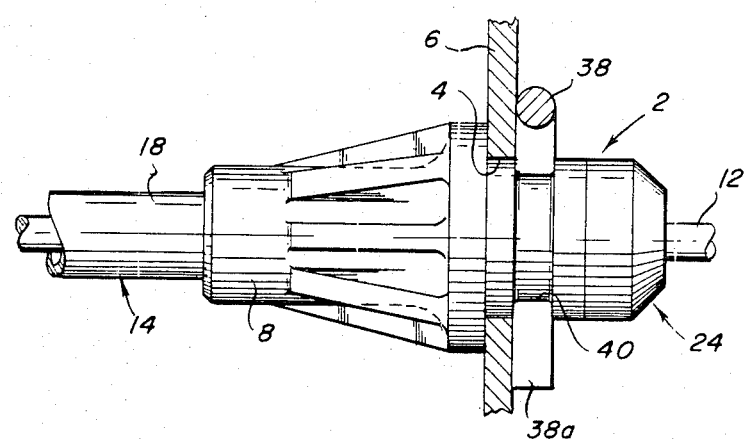
FIGS. 1 and 2 are elevational and longitudinal sectional views, respectively, of a first embodiment of the invention.
Figure 2:
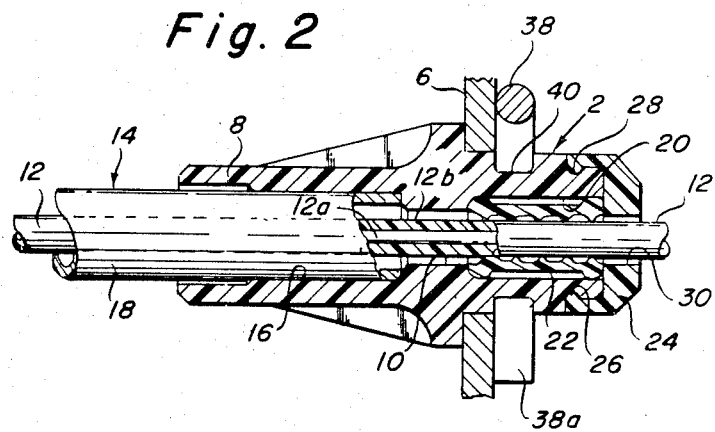
Figure 4:
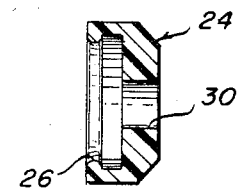
FIGS. 3–5 are sectional views of the body member, seal-retaining cover member, and tubular seal component of the end fitting assembly of FIG. 2.
Figure 3:
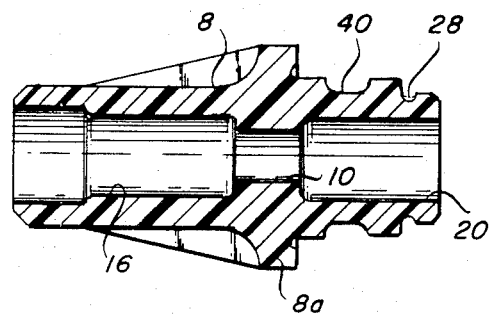

Referring first more particularly to FIGS. 1-5, the end fitting 2 is adapted for mounting in an opening 4 contained in a fixed support 6, which end fitting includes a body member 8 formed of a rigid synthetic plastic material, such as nylon (i.e., high impact base type 66 nylon), DuPont Zytel, Teflon or the like. The body member 8 contains a through bore 10 that receives the inner cable member 12 of a brake cable assembly 14. As is customary in the art, the inner cable member includes a center metal stranded portion 12a, and a protective liner portion 12b formed of synthetic plastic material, such as acetal resin (Celcan), Delrin, or the like. At one end, the body member contains a first counterbore recess 16 that receives (preferably with an interference fit) the end portion of the outer sleeve member 18. At its other end, the body member contains a second counterbore 29 that receives a resilient tubular seal member 22 formed of natural or synthetic rubber, neoprene or the like. The seal member 22 is retained in the second counterbore 20 by a synthetic plastic (i.e., nylon) annular cover member 24 that is connected with said other end of the tubular body member 8 by a snap-fit connection including annular rib 26 on the cover member, and a corresponding annular groove 28 contained in the outer periphery of the body member 28. The bore 30 of the cover member 24 is slightly geater than the diameter of the inner cable member 12.

Figure 5:
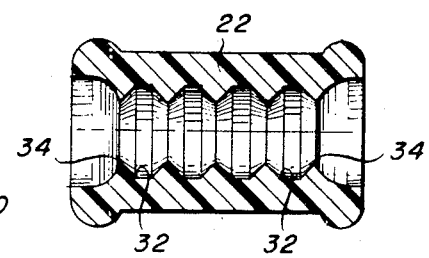

As shown in FIG. 5, the tubular resilient seal member 22, which has an internal diameter equal to that of the inner cable member 12, is provided on its inner surface with a plurality of annular recesses 32 having divergent walls that define longitudinally spaced annular ridges 34 that circumferentially engage the outer periphery of the inner cable member 12, thereby to retain lubricant in the annular space or chamber between the inner and outer cable members, and also to prevent undesirable particles of impurities from entering this annular space.

As is known in the art, the end fitting 2 is retained in the support opening 4 by the cooperation, on the one hand, of annular flange portion 8a, which extends circumferentially about the body member 8, with one face of the support 6, and, on the other hand, a U-shaped resilient clip member 38 having leg portions 28a that extend in a corresponding external groove 40 on the body member 8, which clip member cooperates with the other surface of the support.

Thus, in the embodiment of FIGS. 1-5, the synthetic plastic fitting affords an efficient seal for the space between the inner and outer cable members, which fitting is positively retained in place by the U-shaped resilient clip 38.

Referring now to the embodiment of FIGS. 6-9, the synthetic plastic seal-retaining cover member 124 is connected with the right-hand end of synthetic plastic body member 108 by a snap-fit connection defined by the cooperation between annular rib 126 on the inner circumference of the cover member, and external rib 129 on the body member 108, thereby retaining the resilient seal member 122 within the second counterbore recess 120. In this embodiment, the means for retaining the end fitting in the support opening 4 includes an annular flange 108a on the outer circumference of the body member 108, and a plurality of outwardly extending retaining fingers 124a that are integral with the cover member 124 and extend outwardly generally axially toward the left-hand end of the body member 108 for engagement with the corresponding surface of support 6. Therefore, the circumferential flange 108a and the retaining fingers 124a engage opposite sides of the support 6 to retain the end fitting in the support opening 4.

It will be noted in FIGS. 7 and 9 that the right-hand end of the cover member 124 is provided with a frustoconical portion 124b that converges toward the inner cable member 12. In the illustrated embodiment, the minimum diameter of the frustoconical portion is slightly greater than the diameter of the inner cable member 12. As will be developed in greater detail below, if the minimum diameter of the frustoconical converging portion approximates the diameter of the inner cable member, a scraping action is produced to remove particles from the inner cable member 12 and thereby further isolate the annular space between the inner and outer components of the brake cable assembly.

Figure 10:
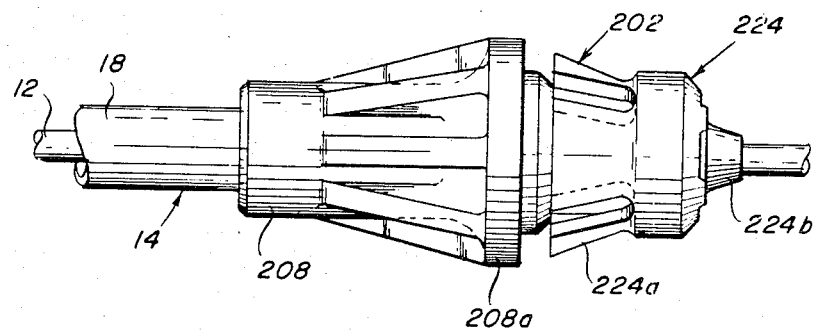
FIGS. 10 and 11 are elevational and sectional views, respectively, of a modification of the embodiment of FIGS. 6 and 7.
Figure 11:
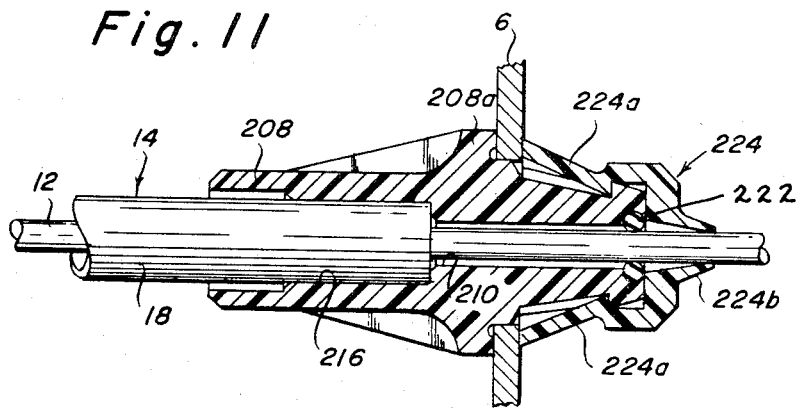

In the modification of FIGS. 10 and 11, the tubular seal means 122 of the embodiment of FIG. 7 has been replaced by a conventional resilient O-ring 222 that is retained in a corresponding second counterbore in the right-hand end of the synthetic plastic body member 208 by the synthetic plastic cover member 224 that is connected with the body member by a snap-fit connection.

Figure 12:
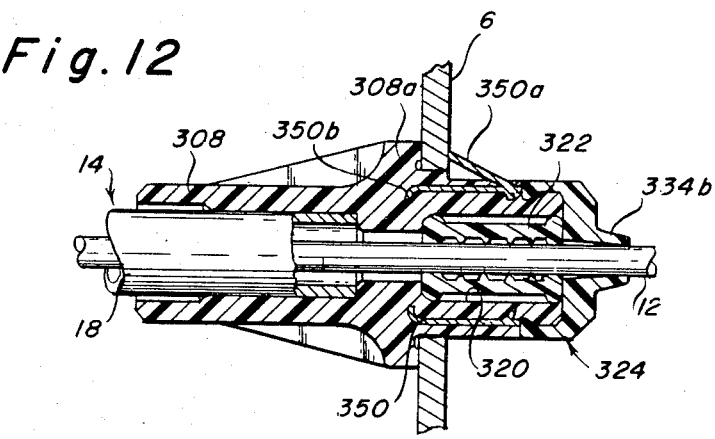
FIG. 12 is a modification of the end fitting of FIGS. 1 and 2 including retaining finger means formed on a separate metallic sleeve.
Figures 24, 25:
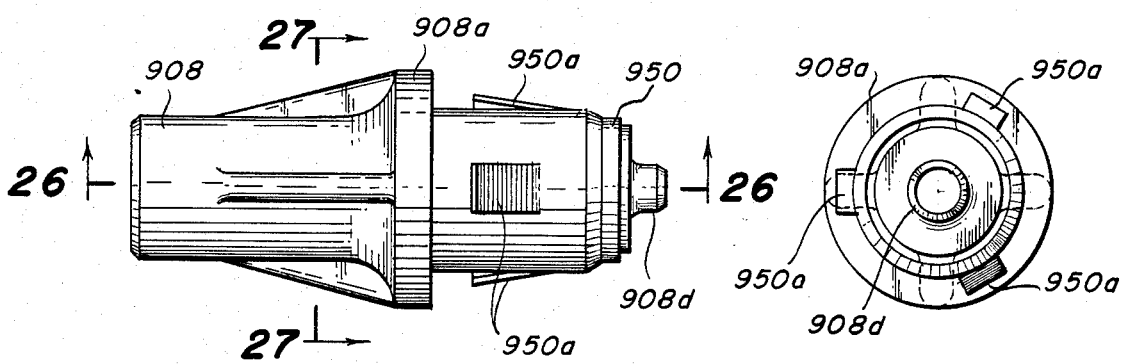
FIGS. 24 and 25 are side elevational and right hand end views, respectively, of a preferred form of the invention having integral scraper means.
Figures 26, 27:
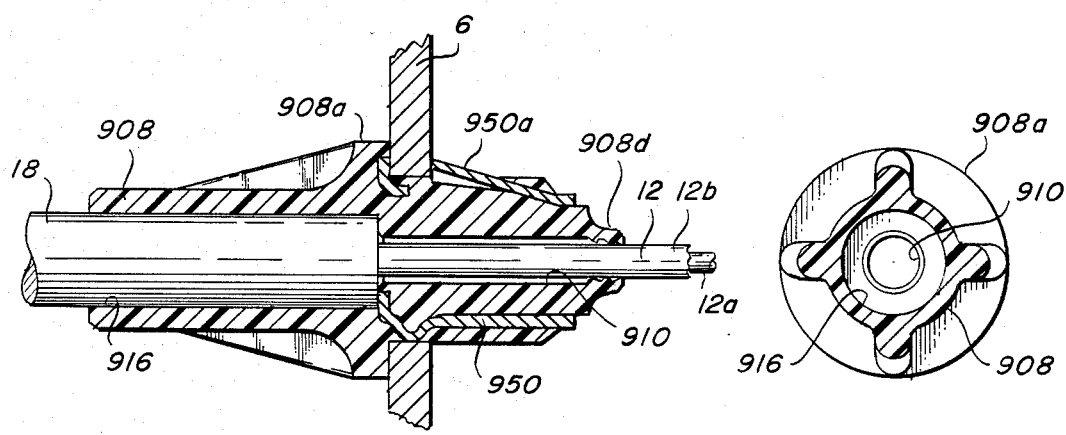
FIG. 26 is a longitudinal sectional view of the fitting of FIG. 24.
FIG. 27 is a sectional view taken along line 27—27 of FIG. 24.

Referring now to the embodiment of FIG. 12, the seal means 322 is of the tubular configuration and is retained in the second counterbore recess 320 by the snap-fit cover member 324. In this embodiment, the retaining finger means are defined by integral fingers 350a that are partially punched outwardly from a metallic spring steel tubular member 350 that is embedded in the synthetic plastic body member 308. Thus, the retaining finger means 350a—that are circumferentially spaced about the metal tubular member 350—extend outwardly generally axially toward the left-hand end of the tubular body member 308, thereby to engage the surface of support member 6 that is on the opposite side of the surface that is engaged by circumferential flange 308a of the body member 308. The metallic sleeve 350 is provided with inwardly bent tab portions 350b that retain the metallic sleeve member against axial displacement relative to the synthetic plastic body member 308. The structure of the metallic sleeve member 350 is similar to that which will be described below with reference to FIGS. 20–23.

The embodiment of FIGS. 13–15 corresponds generally with that of FIGS. 6–9, the only difference being that instead of having a plurality of retaining fingers provided on the cover member 424, a conventional U-shaped resilient clip 38 is provided for retaining the end fitting within the support opening 4. The snap-fit cover member 424 retains the resilient tubular seal member 422 within the second counterbore recess 420.

Referring now to the embodiment of FIGS. 16 and 17, the annular seal means 522 comprises an O-ring formed of resilient material, such as Neoprene, rubber or the like, that is maintained against the end wall of the second counterbore recess 520 by an annular central projecting portion 524c on the cover member 524. Thus, when the cover member 524 is brought into snap-fit connection with the synthetic plastic body member 508, the central annular projecting portion 524c of the cover member 524 forces the O-ring seal member 522 into the bottom of the second counterbore recess 520, thereby positively maintaining the seal means 522 in a position to isolate the annular space between the inner and outer cable components against particles of impurities and other contamination.

Referring now to the embodiment of FIGS. 18 and 19, the synthetic plastic body member 608 is of integral one-piece construction that is maintained in position within the support opening 4 by the cooperation between circumferential annular flange portion 608a on the one hand, and U-shaped spring clip 38, on the other hand, that engages external groove 640 on the body member for engagement with the opposite surface of support member 6. In this embodiment, the O-ring seal member 622 is embedded within the tubular body member 608 during the initial molding thereof. In this embodiment, the right-hand extremity of the body member 608 terminates in a converging frustoconical portion 608b the minimum diameter of which corresponds with the diameter of the inner cable member 12, whereby the converging frustoconical portion serves as a scraper device for scraping from the inner cable member scale and other accumulated particles of impurities. Thus, both the scraper portion 608b and the resilient O-ring seal member 622 serve to retain lubricant within the space between the inner and outer components of the cable assembly, and also to isolate this annular space from external particles of impurities.

Referring now to the embodiment of FIGS. 20–22, the fitting body 708 is formed of synthetic plastic material and has embedded therein a tubular seal member 722 formed of a suitable resilient material such as Neoprene. Also embedded concentrically within the fitting body 708 is a metallic retaining sleeve 750 that is formed of spring steel or the like, which retaining member is generally of the configuration illustrated in the aforementioned Gordy et al U.S. Pat. No. 4,131,379. More particularly, the retaining sleeve member includes circumferentially-spaced outwardly extending retaining fingers 750a that extend toward the left-hand end of the fitting for engagement with the rear surface of support member 6, thereby cooperating with the annular circumferential flange portion 708a of the fitting body to retain the fitting in the support opening. At its left-hand end, the metallic retaining sleeve 750 includes circumferentially-spaced radially outwardly extending tab portions 750b that prevent axial displacement of the metallic sleeve member relative to the synthetic plastic fitting body 708.

Referring now to the embodiment of FIG. 23, the fitting body 808 is again of integral one-piece construction and is initially molded to have embedded therein the O-ring seal member 822, the inner diameter of which corresponds with the diameter of the inner cable member 12. In this embodiment, the right-hand end portion 808b of the fitting body is of convergent frustoconical configuration, the minimum diameter of frustoconical portion 808b corresponding with the diameter of inner cable component 12. Consequently, the scraper portion 808b will scrape scale and other contaminants from the inner cable component 12, and thereby cooperate with the seal member 822 to prevent particles of impurities from entering the annular space between the inner and outer components of the cable assembly.

Referring now to FIGS. 24–29, the fitting includes a body member 908 formed of rigid synthetic plastic material, such as G.A.F. Thermoplastic Polyester 1602Z, having a through bore for receiving the inner cable member 12, and a counterbored recess 916 for receiving the outer cable sheath 18. As in the other embodiments, the inner cable member includes a metal strand core 12a, and an outer synthetic plastic liner layer 12b. Integral external flange portion 908a of the body member abuts one face of the support plate 6 containing the opening in which the body member is mounted, and metal sleeve 950 embedded concentrically in the body member includes radially outwardly-biased resilient fingers 950a that lockingly engage the other face of the support.

Figures 28, 29:
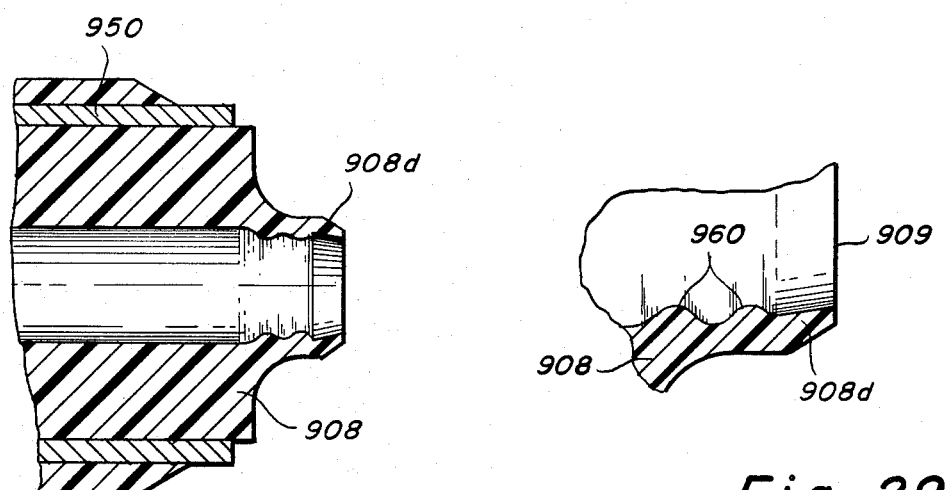
FIGS. 28 and 29 are detailed sectional views of the scraper portion of the fitting of FIG. 26.

As shown in greater detail in FIGS. 28 and 29, the other end of the body member remote from the first recess 916 includes an axially projecting generally frustoconical portion 908d defining scraper means for removing impurities from the outer peripheral surface of the inner cable member when it is displaced to the left relative to the outer cable sheath 18, thereby to prevent the impurities from entering the space between the inner and outer cable members. Thus the scraper portion 908d terminates at a relatively sharp annular edge 909 the diameter of which corresponds with that of the inner cable member.

Also mounted within the axially projecting frustoconical portion are a pair of integral annular rounded sealing ribs 960 the inner diameters of which also correspond with the diameter of the inner cable member, whereby the rounded surfaces of the ribs are in sealing engagement with the peripheral synthetic plastic peripheral liner layer of the inner cable member. The sealing ribs 960 are thus operable to retain lubricant in the annular space between the inner and outer sheath members of the cable assembly. In FIG. 29, typical dimensions are shown for the sealing rib and scraper portion of a synthetic plastic snap-in brake cable fitting having an overall length of 1.73 inches and adapted for insertion within an opening of about 0.540 inches diameter formed in the support plate 6.

Figure 30:
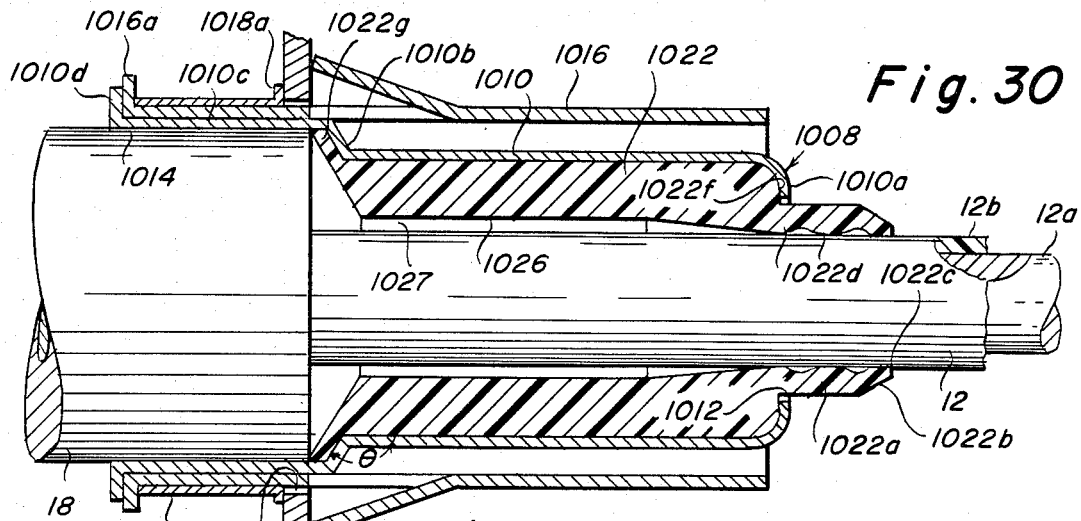
FIGS. 30-32 are sectional views of fitting embodiments wherein the scraper means is integral with a seal member contained, respectively, in a rigid fitting of the self-retaining anchor type, a tubular metal turning, and a synthetic plastic body member.

Referring now to the fitting of FIG. 30, the body means 1008 is of the self-retaining anchor fitting type illustrated in the aforementioned Gordy et al U.S. Pat. No. 4,131,379. The anchor fitting assembly includes an inner sleeve member 1010 having at its right hand end a transverse wall portion 1010a containing a central opening 1012, and at its left hand end a stepped wall portion 1010b that leads to an enlarged cylindrical portion 1010c containing a first cylindrical counterbore recess 1014 for receiving the outer cable sheath 18. At its free end, the enlarged cylindrical portion terminates in an external annular support flange portion 1010d that defines a first abutment means. Arranged concentrically about the inner sleeve member 1010 is an outer sleeve member 1016 having at its left hand end an external annular support flange portion 1016a that defines second abutment means in engagement with the first abutment means 1010d. Annular collar member 1018 mounted concentrically about the outer sleeve member engages at its left hand end the second abutment means 1016a, and at its right hand end includes an annular external flange portion 1018a that is adapted to abut the fixed support 6 when the assemblage is inserted through the opening 4 contained therein.

Mounted concentrically within the inner sleeve member 1010 is a tubular seal member 1022 formed of a resilient synthetic plastic material, such as DuPont "Zytel" ST 811 HS. At one end, the seal member has an integral annular portion 1022a that projects axially through the wall opening 1012 concentrically about inner cable member 12. At its free extremity, the annular projecting portion terminates in a frustoconical scraper portion 1022b having a flat cylindrical inner surface terminating in a sharp annular inner edge 1022c the diameter of which corresponds with the outer diameter of the synthetic plastic liner layer of the inner cable member. Also carried by the projecting portion 1022a are a pair of seal ribs 1022d having rounded surfaces in sealing engagement with the periphery of the inner cable member, the internal diameter of the annular rib portions corresponding with the diameter of the inner cable member. The seal includes an end surface 1022f in abutting engagement with end wall 1010a, and at its other end, the seal includes an outwardly flared flange portion 1022g that extends within the counterbore recess 1014 formed in one end of the inner sleeve member 1010. The angle $\theta$ of the outward flare of the flange portion 1022d corresponds with that of the stepped wall portion 1010b of inner sleeve member 1010, which angle $\theta$ is about 120°. When the flange portion 1022g is compressed between the outer sleeve member 18 and the stepped wall portion 1010b a sealing effect is produced in addition to that produced by the seal ribs 1022d, thereby producing double sealing of the space between the inner and outer cable members by the seal member 1022. It should be noted that the longitudinal bore 1026 extending through the seal member converges inwardly from the left hand end toward the sealing ribs 1022d, whereby lubrication may be contained within the annular space or chamber 1027 between the inner cable member and the seal.

Figure 31:
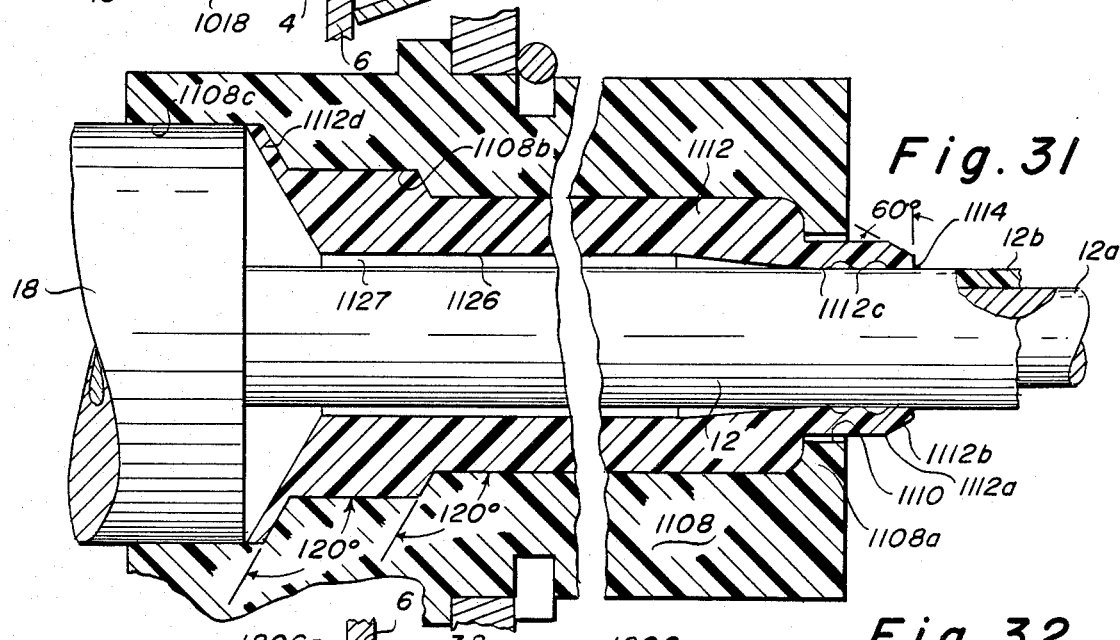

Referring now to the embodiment of FIG. 31, the body member 1108 comprises a tubular turning having at one end an end wall 1108a containing an opening 1110. Adjacent its other end, the turning body includes a pair of counterbored portions 1108b and 1108c having enlarged counterbored diameters, respectively. The second enlarged portion 1108c contains a cylindrical recess for receiving the cable outer sheath. At its right hand end, the resilient seal member 1112 has an annular portion 1112a that projects through the wall opening 1110 concentrically about the inner cable member, which annular projecting portion terminates in a frustoconical scraper portion 1112b having a flat cylindrical inner surface terminating in a relatively sharp annular scraper edge 1114. A pair of annular sealing ribs 1112c are provided on the inner circumference of the annular projecting portion, which ribs have rounded inner surfaces in sealing engagement with the synthetic plastic liner layer 12b of the inner cable member 12. At its other end, the seal member includes a flared flange portion 1112d that is compressed between the outer cable sheath 18 and the end wall of counterbored portion 1108c, thereby to further seal the space or chamber 1127 between the inner and outer cable members.

Figure 32:
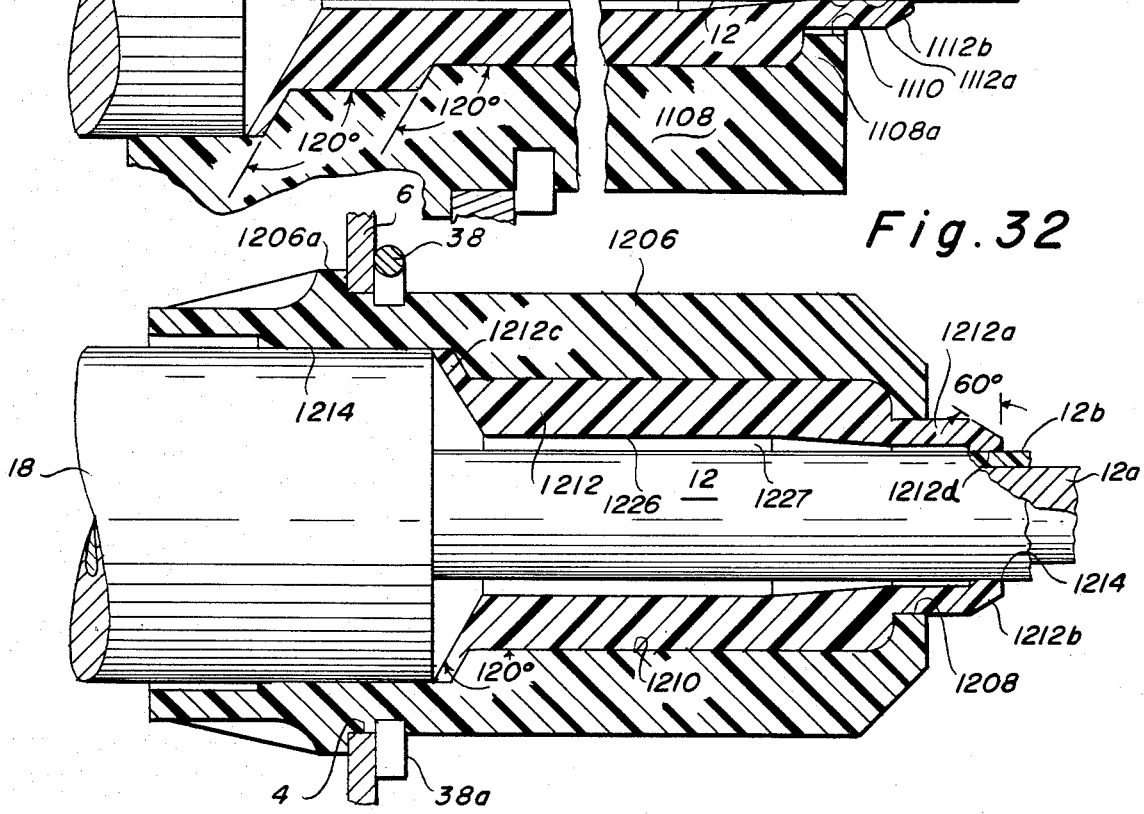

The various seal embodiments can be mounted in a unitary synthetic plastic fitting as shown in FIG. 32. In this embodiment, the rigid body member 1206, contains a through bore 1208, the left hand end of the body member including a first counterbore defining a first recess 1210 for receiving the resilient seal member 1212, and a second counterbore defining a larger second recess 1214 for receiving the end portion of the outer cable sheath 18. At one end the seal includes an annular portion 1212a that projects through the through bore opening 1208 concentrically about the inner cable member and carries the frustoconical scraper portion 1212b flat cylindrical inner surface terminating in a relatively sharp annular scraper edge 1214. At its other end the seal member includes a flared flange portion 1212c that is compressed between an outer cable sleeve 18 and the corresponding end wall surface of the recess 1214, thereby to seal the annular chamber 1227. In this embodiment, the provision of sealing ribs within the projecting annular seal portion (corresponding to the pairs of sealing ribs shown in the embodiments of FIGS. 30 and 31) are omitted, the sealing at this end of the seal being effected by the engagement between the flat cylindrical surface 1212d on the inner circumference of the scraper portion 1212b, the diameter of this surface corresponding with that of the inner cable member. In this embodiment, flange portion 1206a and spring clip 38 engage opposite sides of the support 6 to retain the cable fitting with the support opening 4.

While in accordance with the provisions of the Patent Statutes, the preferred forms and embodiments of the invention have been illustrated and described, it will be apparent to those skilled in the art that various changes and modifications may be made without deviating from the inventive concepts set forth above.

What is claimed is:
1. A cable assembly, comprising
   (a) a tubular outer cable sleeve (18);
   (b) an inner cable member (12) adapted for longitudinal displacement within said sleeve, said inner cable member including a stranded metal core por- tion (12a), and a protective outer synthetic plastic layer (12b) surrounding said core portion;

(c) a fitting body (1008, 1108, 1206) containing at one end thereof a longitudinal bore defining at the other end of the fitting a first end wall containing a through opening (1012, 1110, 1208), said fitting body also containing at said one end a longitudinal counterbore (1014, 1108c, 1214) defining a second end wall, said counterbore having a diameter corresponding generally with the outer diameter of said cable sleeve; and (d) a tubular resilient seal member (1022, 1112, 1212) arranged concentrically within said bore in abutting engagement with said first end wall, said seal member containing a longitudinal through bore (1026, 1126, 1226) the diameter of which is greater than that of said inner cable member, thereby to define an annular lubrication chamber (1027, 1127, 1227) extending generally the length of said fitting body, said seal member including at one end an annular projecting portion (1022a, 1112a, 1212a) that extends through said wall opening, said outer sleeve member being mounted in said fitting counterbore with said inner cable member extending longitudinally through said seal member projecting portion;

(e) said seal member including at the free extremity of said projecting portion radially inwardly directed annular first sealing means (1022d, 1112c, 1212d) in concentric sealing engagement with said protective outer layer of said cable member, said projecting portion having at its free end a cylindrical inner peripheral surface of a diameter corresponding with the diameter of said inner cable member, said cylindrical inner surface terminating in a sharp scraper edge (1022c, 1114, 1214), thereby to scrape impurities from the inner cable member upon longitudinal displacement thereof relative to said sleeve;

(f) said seal member further including at its other end an outwardly extending annular flange portion (1022g, 1112d, 1212c) defining second sealing means compressed between the end of said sleeve and said second end wall, said first and second sealing means being operable to close the ends of said lubrication chamber.

2. Apparatus as defined in claim 1, wherein said first sealing means comprise a plurality of longitudinally spaced annular ribs.

3. Apparatus as defined in claim 2, and further comprising means for mounting said fitting body in an opening contained in a fixed support.

* * * * *